Feb. 20, 1951     E. E. WASHBURN     2,542,740

DRIVE FOR SAWMILL CARRIAGES

Filed Oct. 1, 1948

Inventor
ERNEST E. WASHBURN

ATTORNEYS

Patented Feb. 20, 1951

2,542,740

UNITED STATES PATENT OFFICE 2,542,740

DRIVE FOR SAWMILL CARRIAGES

Ernest E. Washburn, Brunswick, Maine

Application October 1, 1948, Serial No. 52,261

6 Claims. (Cl. 74—202)

This invention relates to improvements in driving mechanism for saw mill carriages and has for its object the provision of a novel double friction drive for the carriage commonly employed to move the log back-and-forth past the saw in the manufacture of rough lumber.

The preferred embodiment of the invention comprises a driven feed drum cooperatively related to a cable drum for effecting advancing and returning movements of a carrier, combined with oppositely disposed friction drives to engage the periphery of the feed drum for driving the latter and associated cable drum in the opposite directions referred to dependent upon the direction of rotation of the friction drives, combined with pressure plates carrying the friction drives under a uniform and constant pressure, and a lever dog for engaging the pressure plates to force one or the other of the friction drives into operating engagement with the driven feed drum.

An important characteristic of the device thus far described is that the control (lever dog) may be approximately centrally disposed to act on adjacent relatively free ends of the opposite pressure plates so that the lever dog may be readily engaged and operated from a center point, the direction of movement of the saw mill carriage being determined by the engagement of the lever dog with the pressure plate to depress the same and the friction drive with the feed drum, correspondingly freeing the other friction drive and its pressure plate so that the same may rise under the influence of its spring away from operating contact with the driven feed drum.

An additional and important characteristic of the improvements resides in a highly efficient and simple mechanism for adjusting the friction drives relative to the driven friction drum to overcome certain disadvantages of directly adjusting the springs supporting and elevating the ends of the pressure plates bearing against the cooperating portions or feet of the lever dog. In such an adjustment it was found that the tension became so great on the lever dog that the operator was unable to apply it with satisfactory results, and if lighter springs were resorted to the lever dog would not maintain its upright position, thereby causing the friction drives to drag or clatter on the driven feed drum. Therefore, the preferred embodiment of the invention also embraces the employment of adjusting plates pivotally mounted on the pressure plates, and supporting the friction drives thereon, combined with adjusting devices between the ends of the adjusting plates—opposite the pivoted ends—for effecting a rise and fall of the plates and corresponding movement of the friction drives away from, or towards the driven feed drum, to the end that in such an arrangement the simple adjustment of the adjusting plates will avoid the adjusting of the relatively strong springs supporting the pressure plates into impinging relationship to the lever dog.

The foregoing structures and advantages thereof will be more clearly understood from the accompanying drawing, forming part hereof, wherein the foregoing embodiments of the invention are illustrated, when considered in connection with the detailed description thereof hereinafter contained.

Figure 1:
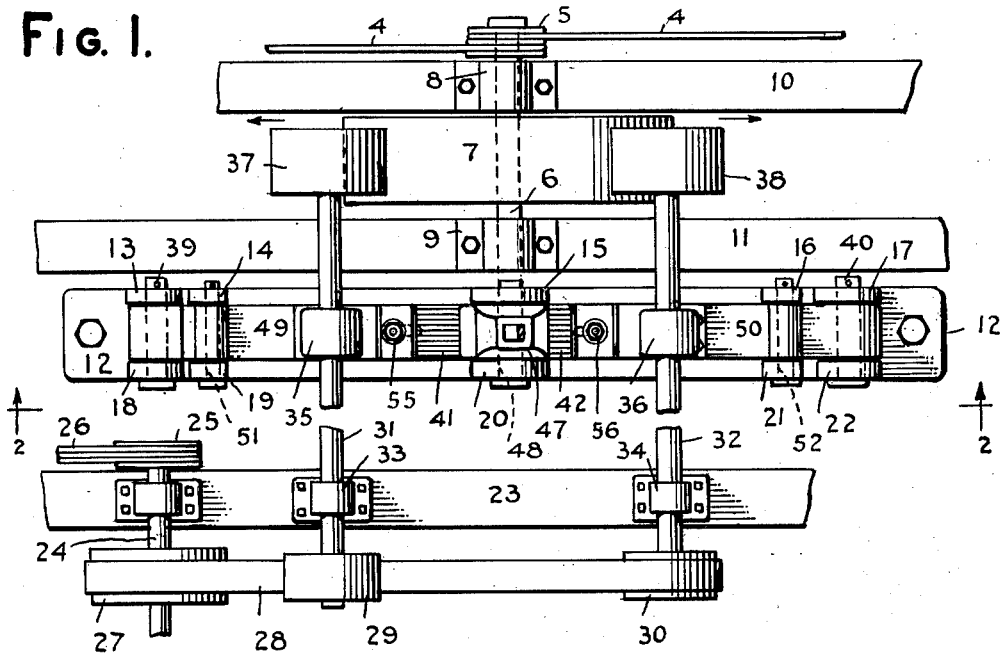
Figure 1 is a fragmentary top view of a saw mill carriage drive.

Referring more specifically to the drawings wherein like reference numerals designate corresponding parts in the several views 4 represents a customary cable winding upon a drum 5, and connected at its opposite ends to a saw mill carriage (not shown) for the purpose of drawing the carriage ahead or back in customary fashion, the drum 5 being driven from a shaft 6 with which a large feed drum 7 is driven, said shaft being freely rotatable in bearings 8 and 9 mounted on supporting beams 10 and 11 of a base framework for the machine. This framework also comprises a base casting 12 of strong construction, having in the vertical plane of the edge thereof upstanding flanges or ears 13, 15 and 17 in horizontal alignment with corresponding flanges 18, 20 and 22 in the vertical plane of the opposite edge of the base casting 12, for purposes to be hereinafter defined.

This base casting 12 is located at approximately the center of the machine.

Parallel with the base casting 12 of the framework of the machine also further includes an additional supporting beam 23 for supporting the driving mechanism now to be pointed out.

The driving mechanism comprises a saw arbor 24, carrying a drum 25, driven by a belt 26, operated from the usual power house, not necessary to be illustrated herein.

Figure 3:
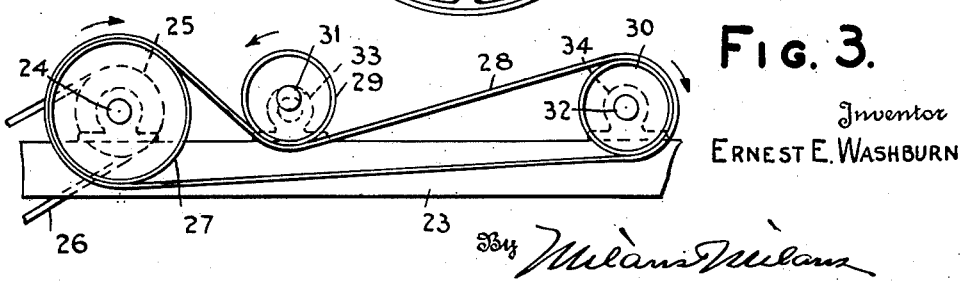
Figure 3 is a front view of the associated pulleys and drive mechanism for the mechanism for operating the friction drives in the desired opposite directions.

It will be noted that the arbor 24 has a pulley 27 rotatively associated therewith for driving an endless belt 28. This belt 28 is in frictional engagement with pulleys 29 and 30 and in view of the fact that the upper flight of the belt passes beneath the pulley 29, said pulley is driven in an anti-clockwise direction while the pulley 30 is driven in a clockwise direction, as indicated in Figure 3 of the drawings.

The pulley 29 is mounted on a shaft 31, and the pulley 30 is likewise mounted on a shaft 32, these shafts passing through and working in self-aligning ball bearings diagrammatically illustrated at 33 and 34 on the beam 23, and similar bearings 35 and 36 from which bearings the shafts 31 and 32 extend outwardly into the vertical plane of the driven feed drum 7, where they carry friction drives 37 and 38 adapted to rotate said feed drum, and through the drum 5 and cable 4, shift the carriage ahead or back depending upon which one of the friction drives 37 or 38 is in contact with the driven drum 7. These friction drives 37 and 38 are formed or faced with any suitable fibre or material as will be apparent to persons skilled in the art to which the invention relates.

Figure 2:
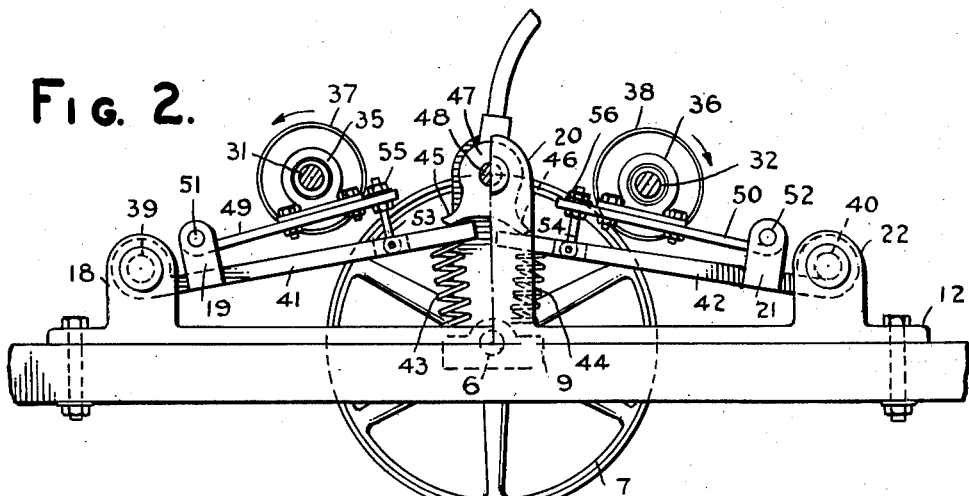
Figure 2 is a longitudinal sectional view on the line 2—2 of Figure 1 looking in the direction of the arrows.

Pivoted on suitable pins 39 and 40, passing through the respective pairs of ears or upstanding flanges 13 and 18 and 17 and 22 are oppositely extending pressure plates 41 and 42, the same extending inwardly towards each other to approximately the longitudinal center of the machine where the inner ends of said plates are relatively free (Figure 2), said plates being constantly under the pressure of springs 43 and 44 so as to press the free ends of the plates into engagement beneath the oppositely extending feet 45 and 46 of a controlling lever dog 47 pivoted at 48 between the upstanding ears or flanges 15 and 20.

Normally the pressure plates 41 and 42, with the parts carried thereby, as will presently appear, are strongly pressed upwardly by the springs 43 and 44 into engagement with the feet 45 and 46 of the lever dog.

Superposed with reference to the pressure plates 41 and 42 is a pair of adjusting plates 49 and 50 pivoted at 51 and 52 respectively between the ears or flanges 14 and 19 and 16 and 21, projecting upwardly from the edges of the adjusting plates 49 and 50. These adjusting plates 49 and 50 have their inner or free ends correlated with adjusting bolts and nuts, as clearly shown in Figure 2, whereby the adjusting plates may be moved up-and-down on the bolts 53 and 54, fixed in adjusted position by the nuts 55 and 56 clamping the free ends of the adjusting plates therebetween. This is to provide a simple and easy adjustment for the friction drives 37 and 38 with reference to the driven feed drum 7.

By having an easily accessible nut and bolt arrangement, the positioning of the friction drives, relative to the surface of the driven feed drum 7, is facilitated, avoiding interference or handicap such as would result were fine operating adjustment attempted through adjusting means for the heavy springs 43 and 44. The latter would call for the use of relatively light springs compared to the relatively heavy supporting springs 43 and 44 desired, and the possibility of objectionable drag or clatter of the friction drives 37 and 38 on the driven feed drum 7.

I claim:

1. In a drive for a saw mill carriage, a driven feed drum, in combination with a pair of friction drives arranged to peripherally engage said feed drum, said friction drives rotating in opposite directions relative to each other, a pair of hinged pressure plates carrying said drives, a pivoted lever dog common to the pair of pressure plates, and springs for pressing the pressure plates into contact with the lever dog.

2. In a drive for a saw mill carriage, a driven feed drum, in combination with a pair of friction drives arranged to peripherally engage said feed drum, a pair of hinged pressure plates carrying said drives, a pivoted lever dog common to the pair of pressure plates, springs for pressing the pressure plates into contact with the lever dog, and means carried by the pressure plates for adjusting the position of the friction drives with reference to the periphery of the feed drum.

3. In a drive for a saw mill carriage, a driven feed drum, in combination with a pair of friction drives arranged to peripherally engage said feed drum, a pair of hinged pressure plates carrying said drives, a pivoted lever dog common to the pair of pressure plates, springs for pressing the pressure plates into contact with the lever dog, means carried by the pressure plates for adjusting the position of the friction drives with reference to the periphery of the feed drum, comprising adjusting plates carried by the pressure plates and supporting the friction drives, the adjusting plates being hinged at one end to the pressure plates, and adjusting devices between the relatively free ends of the adjusting plates and pressure plates.

4. In a machine for driving a saw mill carriage, a driven feed drum, in combination with a pair of friction drives arranged to peripherally engage said feed drum, hinged pressure plates carrying said drives, said pressure plates being hinged at their outer ends and the free inner ends projecting towards each other to approximately a common point at the center of the machine, a pivoted lever dog common to the free ends of the pressure plates, and springs for pressing the pressure plates into contact with the lever dog.

5. In a machine for driving a saw mill carriage, a driven feed drum, in combination with a pair of friction drives arranged to peripherally engage said feed drum, hinged pressure plates carrying said drives, said pressure plates being hinged at their outer ends and the free inner ends projecting towards each other to approximately a common point at the center of the machine, a pivoted lever dog common to the free ends of the pressure plates, springs for pressing the pressure plates into contact with the lever dog, and means carried by the pressure plates for adjusting the position of the friction drives with reference to the periphery of the feed drum.

6. In a machine for driving a saw mill carriage, a driven feed drum, in combination with a pair of friction drives arranged to peripherally engage said feed drum, hinged pressure plates carrying said drives, said pressure plates being hinged at their outer ends and the free inner ends projecting towards each other to approximately a common point at the center of the machine, a pivoted lever dog common to the free ends of the pressure plates, springs for pressing the pressure plates into contact with the lever dog, means carried by the pressure plates for adjusting the position of the friction drives with reference to the periphery of the feed drum, comprising adjusting plates carried by the pressure plates and supporting the friction drives, the adjusting plates being hinged at one end to the pressure plates, and adjusting devices between the relatively free ends of the adjusting plates and pressure plates.

ERNEST E. WASHBURN.

REFERENCES CITED

The following references are of record in the file of this patent:

UNITED STATES PATENTS

| Number | Name | Date |
|---|---|---|
| 604,332 | Lewis | May 17, 1898 |

FOREIGN PATENTS

| Number | Country | Date |
|---|---|---|
| 622,106 | Germany | Nov. 19, 1935 |